Nov. 11, 1930.  M. C. PETERSEN  1,781,669
COOKING MACHINE
Filed Oct. 17, 1927   4 Sheets-Sheet 1
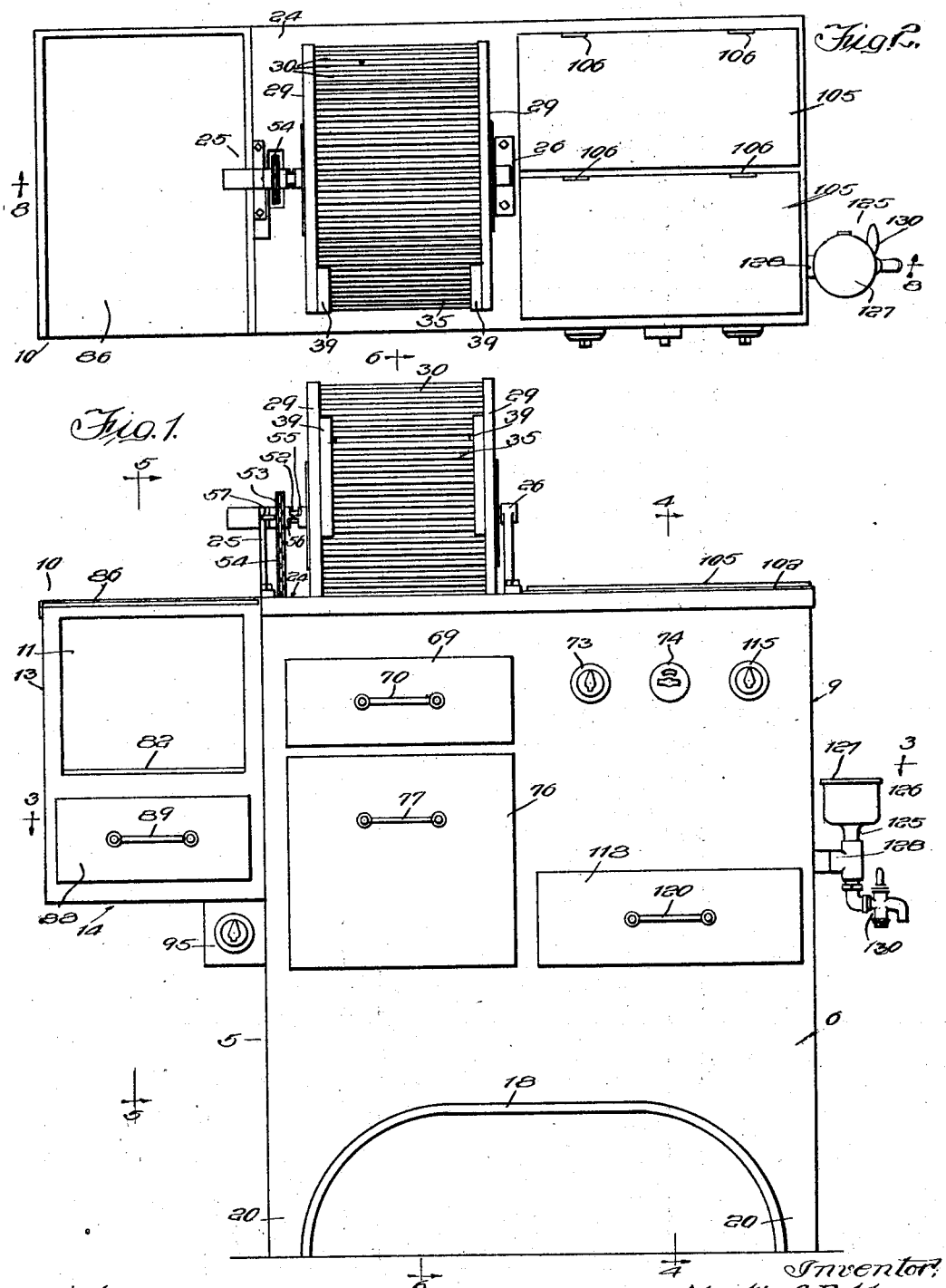

Nov. 11, 1930.  M. C. PETERSEN  1,781,669
COOKING MACHINE
Filed Oct. 17, 1927  4 Sheets-Sheet 2

Witness:
William P. Kilroy

Inventor:
Martin C. Petersen
Brown, Critchlow & Dinner
By
Attys

Nov. 11, 1930. M. C. PETERSEN 1,781,669
COOKING MACHINE
Filed Oct. 17, 1927 4 Sheets-Sheet 3
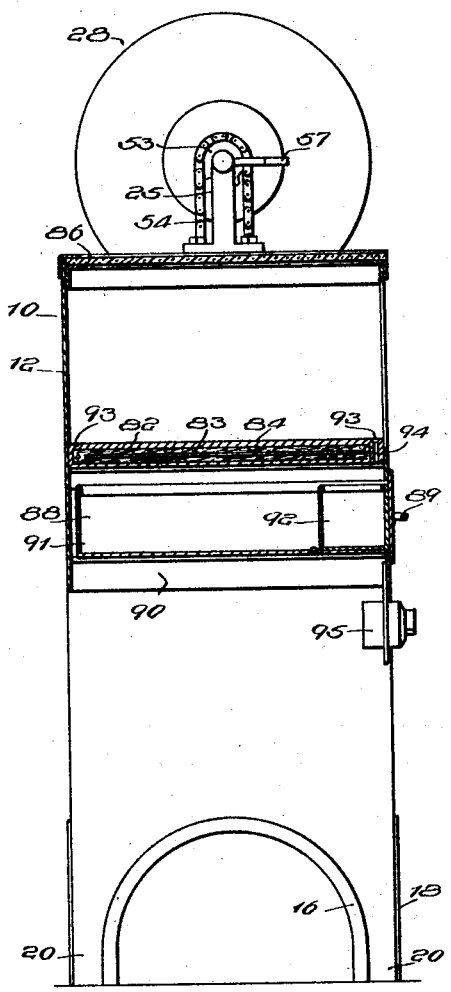
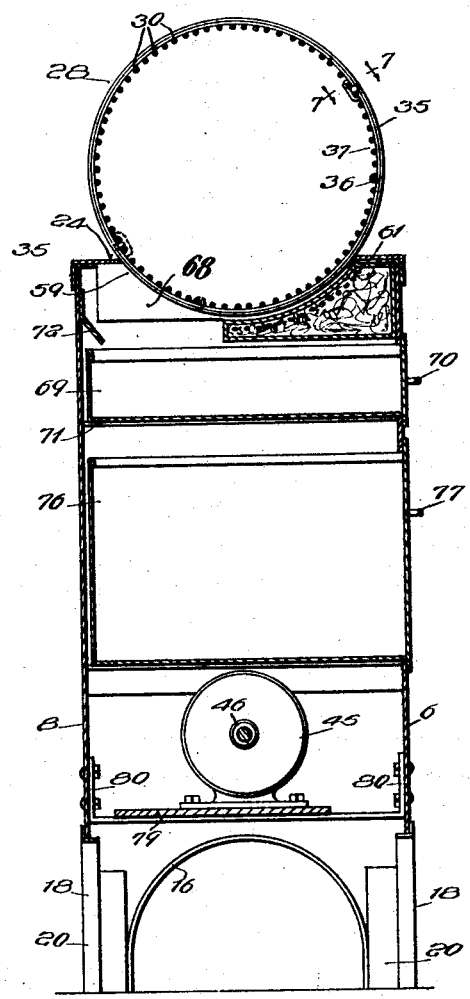
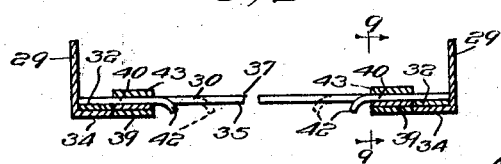
Inventor:
Martin C. Petersen Nov. 11, 1930.  M. C. PETERSEN  1,781,669
COOKING MACHINE
Filed Oct. 17, 1927    4 Sheets-Sheet 4

Witness:
William P. Kilroy

Inventor:
Martin C. Petersen

Patented Nov. 11, 1930

1,781,669

UNITED STATES PATENT OFFICE

MARTIN C. PETERSEN, OF IPSWICH, SOUTH DAKOTA

COOKING MACHINE

Application filed October 17, 1927. Serial No. 226,749.

This invention relates to cooking machines and its object is the provision of an improved cooking process and a generally improved, simplified and inexpensive machine, suitable for public display and having increased utility and better adapted to meet the demand thereon, as it varies or fluctuates with the busy and dull periods of operation.

The invention provides an improved combination of different cookers, one of which is adapted for cooking the Frankfurts or other articles separately from the other cookers or for preparing the article, or articles of food for one of the other cookers selectively as desired. I find that by using one of the cookers for preparing the articles for one of the other cookers, the output of the machine may be materially increased.

The invention further provides an improved storage compartment arrangement and an improved arrangement of heaters for the different cookers and for the different compartments.

The other provisions of the invention will be apparent from the following detailed description taken in connection with the accompanying drawings, in which Fig. 1 is a front elevational view of a machine embodying the present invention;

Fig. 2 is a plan view of the machine shown in Fig. 1;

Fig. 5 is a vertical transverse section taken on the line 5—5 of Fig. 1;

Fig. 6 is a vertical transverse section taken on the line 6—6 of Fig. 1;

Fig. 7 is a fragmentary detail section taken on the line 7—7 of Fig. 6;

Fig. 8 is a vertical longitudinal section taken on the line 8—8 of Fig. 2;

Fig. 9 is a fragmentary detail section taken on the line 9—9 of Fig. 7; and

Fig. 10 is a fragmentary detail section taken on the line 10—10 of Fig. 9.

Figure 3:
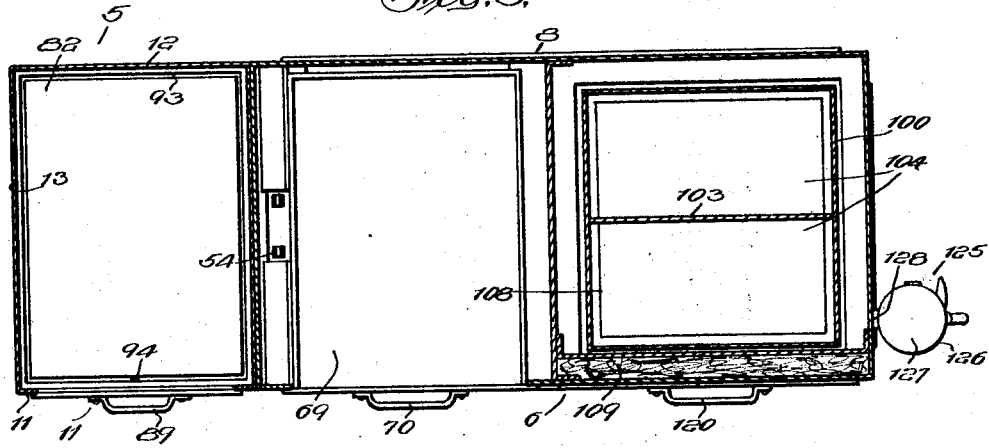
Fig. 3 is a horizontal section taken on the line 3—3 of Fig. 1.

Referring to the drawings, the machine shown comprises an upright housing 5 which may be formed of sheet metal and which has a front wall 6 and a back wall 8. One end of the housing 5 is closed by an end wall 9 and the upper portion of the opposite end is provided with an end extension 10, having a front wall 11, back wall 12, end wall 13 and bottom 14.

The housing 5 is supported at the bottom by arched end supports 16 and arched front and back supports 18. These supports 15 and 18 may be of angle iron formation with the walls of the housing suitably secured thereto and the supports forming four legs 20, one on each of the four corners of the main body portion of the housing 5. An end wall 22 separates the end extension 10 from the main body of the machine and closes the adjacent end of the machine.

The top 24 has a pair of longitudinally spaced bearing brackets 25 and 26 suitably mounted thereon in longitudinal alignment and substantially centrally between the front and back of the machine. Journaled between and at its opposite ends on the brackets 25 and 26 is a cylindrical drum-like carrier 28.

The carrier 28 comprises a pair of generally circular end members 29, 29, with a plurality of circumferentially spaced and cylindrically arranged rods or stays 30 extending longitudinally between the end members 29, 29 and suitably secured at their opposite ends thereto. The rods 30 form a generally cylindrical open enclosure in which the Frankfurts or other articles to be roasted are placed and the open formation of this enclosure exposes the Frankfurts or other articles therein directly to the cooking heat to produce an open roasting or toasting of the articles. The arrangement and spacing of the rods 30 in the particular machine shown is suitable for roasting Frankfurts or other articles but it is to be understood that this open work structure may be varied as desired. The ends of the rods 30 may be welded or otherwise suitably secured to ring members 32 with the end members 29 provided with longitudinally directed marginal flanges 34 adapted to fit over the ring member 32 and to be detachably secured thereto by means of suitable screws or the like.

For the purpose of introducing the Frankfurts or other articles to be cooked into the carrier 28, the carrier is provided with a door 35 hinged as at 36 upon one of the rods 30 adjacent the opening 37, which is adapted to be opened and closed by the door 35. The door 35 is preferably of longitudinal rod or open work formation similar to the cylindrical enclosure of the carrier and when closed forming a part thereof. The door 35 along its opposite edges has frame strips 39 (Fig. 7) and for the purpose of latching the door in closed position, there are a pair of slidable latch members 40. The inner ends of the latch members 40 may be turned out at 42 so that they may be conveniently manipulated with the fingers. These latch members 40 are slidably mounted in straps 43 on the door and when projected with their outer ends in co-operation with the inner periphery of the rings 32 as shown in full lines in Fig. 7, the door is locked in closed position. When the latch members 40 are retracted to the dotted line positions, the door is free to be swung to open position about its hinge mounting 36.

For the purpose of driving or turning the carrier 28 a suitable electric motor 45 is provided. The motor 45 (Fig. 8) is connected at 46 through a suitable reduction gearing 47 with a shaft 48, having a sprocket 49 rotatable therewith.

Rotatable upon one of the spindle extensions at one end of the drum or carrier 28, is a sprocket 53 and trained over the sprockets 49 and 53 is a suitable driving chain 54. The chain 54 turns the sprocket 53 with the sprocket 49 and the sprockets 49 and 53 may be proportioned to give further speed reduction at this point, if desired. The drum or carrier 28, or spindle 52 is provided with clutch means 55 (Fig. 8) and the sprocket 53 is provided with co-operating clutch means 56 shiftable into and out of driving engagement with the clutch means 55 by means of a suitable lever 57. The clutch is shown as disengaged in Fig. 8 so that the sprocket 53 will be rotated without rotating the drum or carrier 28 and by shifting the clutch means 56 into engagement with the clutch means 55, the drum or carrier 28 is connected to be rotated with the sprocket 53.

At the bottom of the drum or carrier 28, the machine has an opening or depression 59 for receiving the bottom of the drum or carrier which depends below the top 24 of the machine. The sides of this opening or depression may be provided with suitable side walls 60 as shown.

Underlying the drum or carrier 28 is a hot plate or heater 61 which is preferably curved, as shown, to conform substantially with the periphery of the carrier 28 with a slight space between the heater and the carrier, so that the movement of the carrier will not be interfered with by the heater. The heater 61 is shown as having parallel upper and lower plates 62 and 63 closed at the ends at 64 and provided internally with a suitable resistance conductor 65, which may be imbedded in asbestos, or other suitable insulating material as indicated at 66.

It will be noted in Fig. 6 that the heater 61 does not underlie the entire bottom of the carrier or drum but extends back only partially from the front of the machine to leave an opening 68 through which the roasted Frankfurts or other contents of the drum 28 may be discharged into a storage compartment in the form of a drawer 69 from which the cooked Frankfurts or other articles may be withdrawn for use as desired. The drawer 69 is provided with a handle 70 and is slidably mounted upon angle brackets 71 within the housing of the machine. In order to discharge the Frankfurts or other contents from the carrier, through the opening 68 and into the drawer 69, the carrier door 35 is swung into open position and the carrier is turned to position the carrier opening 37 over the opening 68, as shown in dotted lines in Fig. 6, so that the Frankfurts or other articles will drop by gravity from the carrier through the opening 68 and into the drawer 69. It is to be understood that the Frankfurts or other articles may be removed through the opening 37 without discharging them into the drawer 69. The drawer 69 underlies the cooking heater 61 and is heated thereby to maintain the cooked Frankfurts heated and in condition for use as called for. The rear wall 8 is provided adjacent the opening 68 with a deflector 72 for directing the Frankfurts or other articles through the opening 68 and into the drawer 69.

By the process of the present invention the door 35 of the carrier 28 is opened and the Frankfurts or other articles are introduced through the opening 37 and into the carrier. Then with the heater 61 turned on by means of a suitable snap switch 73 (Fig. 1) the rotation of the carrier 28 is started by turning on the motor circuit by means of a switch 74 and throwing in or engaging the clutch means 55, 56. As the carrier 6 begins to turn the Frankfurts or other articles therein are carried with the carrier upwardly in the direction of rotation of the carrier and as they approach or reach the horizontal axis of the carrier they tumble back or drop and are thereby turned over automatically and continuously with the rotation of the carrier to expose all surfaces to the heater and produce a uniform roasting or toasting of the articles. The drum or carrier forms in effect a tumbling carrier which continuously tumbles the articles therein with the rotation of the carrier, continuously turning them over for a uniform exposure to the heat which may be directly imposed upon the articles through the open work carrier construction.

Underlying the drawer 6 is a relatively large storage bin or drawer 76 provided with a handle 77 and adapted for storing rolls, buns, bread or other articles for making up sandwiches or to be served from the machine. The drawer 76 is slidably mounted upon angle brackets 78 within the housing of the machine above the motor 45 and driving connections.

The motor 45 and reduction gearing 47 with the connections therebetween are mounted upon a common shelf 79 which is adjustably secured at 80 upon the front and rear walls 6 and 8. The adjustable mounting of the shelf 79 permits the shelf and the motor and reduction gearing carried thereby to be raised or lowered for the purpose of tightening or slackening the driving chain 54.

The end extension 10 is provided between the upper and lower end of the wall 13 with a horizontal hot plate 82 having top, bottom and marginal walls enclosing the heating resistance conductor 83 which may be embedded in asbestos or other suitable insulating material 84 as shown in Fig. 8. The hot plate 82 is supported in horizontal position upon angle brackets 85 and the walls of the hot plate may be cast or otherwise suitably formed. The hot plate 82 is of generally rectangular formation as shown in Fig. 3 and its upper surface forms a cooking surface for frying eggs, Hamburger steak or other articles of food.

The top of the end extension 10 is covered by a wall 86 of glass or other suitable transparent material which glass wall 86 forms a service counter for serving the articles from the machine.

Underlying the hot plate 82 is a drawer 88 provided with a handle 89 and slidably mounted upon angle brackets 90 in the end extension 10. The drawer 88 is provided, as shown in Fig. 5 with a rear compartment for storing Hamburger steak or other food adapted to be cooked upon the hot plate 82. This rear compartment is designated at 91 and at the front of the drawer 88 is a removable receptacle 92 for catching the grease from the upper or cooking surface of the hot plate 82. The upper or cooking surface of the hot plate 82 is provided with a surrounding drain groove 93 and at the front of the plate is a passageway 94 (Fig. 5) which opens from the groove 93 down through the hot plate 82 and forms a drain passage for delivering the grease from the drain groove 93 to the receptacle 92 which may be emptied from time to time by removing the receptacle 92 from the drawer 88.

It will be noted that by disposition between the overlying hot plate 82 and the drawer 88 the hot plate 82 forms the cooking heater for the hot plate and at the same time maintains the contents of the drawer 88 in heated condition. The circuit through the resistance element 83 of the hot plate 82 is controlled by a suitable switch 95 on the front of the machine. Instead of using the relatively large drawer or compartment 76 as a storage compartment I contemplate embodying a refrigerating unit in the machine and using this drawer or compartment 76 as a refrigerating compartment. The refrigerating unit could be operated by the motor 45.

Figure 4:
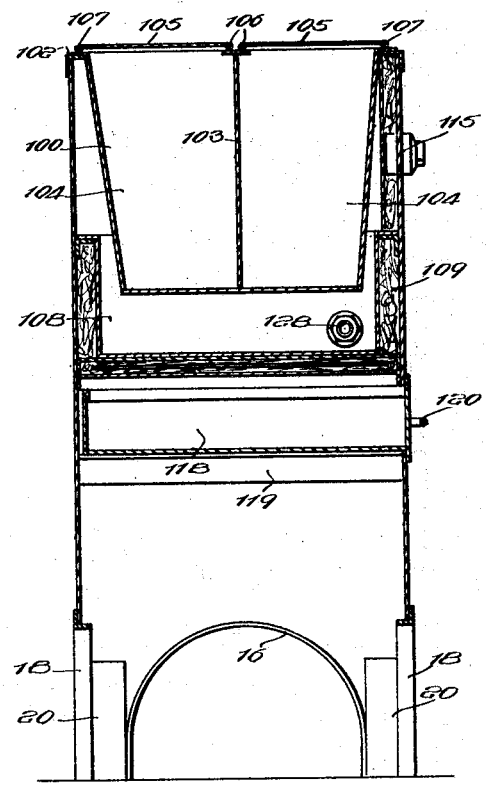
Fig. 4 is a vertical transverse section taken on the line 4—4 of Fig. 1.

At its opposite end the machine is provided with a receptacle 100 having suspended support by a flange 102 along its upper edge, which flange 102 is adapted to rest upon the top portion 24 of the machine. The receptacle 100 may be divided by a partition 103 as shown in Fig. 4 and it depends into the housing of the machine being preferably adapted to be lifted from the machine and conveniently replaced. The tops of the compartments 104 of the receptacle 100 are provided with doors 105 suitably hinged at 106 and beaded along their free edges at 107.

When the receptacle 100 is in place in the machine its bottom portion depends into a receptacle 108 which is preferably surrounded by asbestos 109 or other suitable insulating material interposed between the wall of the receptacle 108 and the adjacent walls of the machine. Underlying the receptacle or pan 108 is a heater 110 which may comprise a suitable resistance conductor 112 embedded in asbestos or other suitable insulating material 113 which is in turn covered by the walls of the heater. The circuit through the heater 110 is controlled by a suitable switch 115 arranged on the front of the machine as shown in Fig. 1.

Underlying the heater 110 is a storage drawer 118. This drawer 118 is heated by the overlying heater 110 and is slidably mounted upon brackets 119 in the housing of the machine. The drawer 118 may be provided with a suitable handle 120.

The receptacle 108 is adapted to contain a body of water and for the purpose of introducing the water into the receptacle a suitable filler 125 is provided. The filler has an intake or receiving cup 126 which may be provided with a removable cover 127 and a pipe and T connection 128 opens from the cup 126 through the wall of the machine and through the wall of the receptacle 108 into the interior thereof. By introducing or placing water into the receptacle 108 and turning on the heater 110 the Frankfurts or other articles may be placed in the compartments 104 and steamed either for use or by way of preparing them for the roasting or toasting drum or carrier 28. While the carrier 28 and the automatic tumbling process has a wide range of capacity, by placing the Frankfurts in the compartments 104 and steaming them before the roasting process the capacity of the machine may be increased by decreasing the time required to roast the Frankfurts because of their preceding preparation in the compartments 104. One or both of the compartments 104 are also adapted for use as storage compartments for maintaining the Frankfurts in proper condition either before or after cooking or roasting and by placing water in one or both of the compartments 104 the Frankfurts or other articles may be boiled directly therein thereby greatly increasing the utility of the machine.

The filler 125 may be provided with a spout or faucet 130 for withdrawing hot water from the receptacle 108, for use as desired. The heater 110 obviously forms a common heater for the vessel 108 as well as for the compartments 104 and drawer 118. The compartment or space above the hot plate 82 and between it and the glass plate 86 may be closed at the back or sides with the front adjacent the operator open to permit the food to be placed upon and removed from the hot plate 82. The improved cooking process has a wide range of capacity and the automatic tumbling produces good results. The rotation of the carrier 28 with the articles cooking therein provides an attractive display and the machine has increased utility with the various cooking and heater arrangements as well as the storage compartments and other parts arranged compactly and for great efficiency.

I do not intend to be limited to the precise details shown or described.

I claim:

1. In a machine of the class described, the combination of a generally cylindrical carrier for loosely holding the articles, a receptacle underlying the carrier, a heater completely encased in a casing interposed between the carrier and said receptacle and curved about the periphery of the carrier to impose the heat uniformly and over a relatively great area without extending across the entire bottom of the carrier, said heater extending only partially about the bottom of the carrier to form a space opening from the carrier to said receptacle and a door on said carrier adapted to be registered with said space for the delivery of the articles by gravity from said carrier to said receptacle.

2. In a machine of the class described, the combination of a rotatable cylindrical roasting drum for loosely holding Frankfurters, a heater completely encased in a curved metallic casing conforming to the contour of said drum and underlying a part of it, and means for rotating said drum to thereby tumble the Frankfurters in it to evenly expose them to said heater.

3. In a machine of the class described, the combination of a rotatable cylindrical roasting drum for loosely holding Frankfurters, an electric heater completely encased in a curved metallic casing conforming to the contour of said drum and underlying a part of it, and means for rotating said drum to thereby tumble the Frankfurters in it to evenly expose them to said heater.

4. In a machine of the class described, the combination of a rotatable cylindrical roasting drum for loosely holding Frankfurters, a heater unit underlying a part of said drum, said unit comprising a completely closed metallic casing having a curved surface conforming to the contour of said drum and containing the heat generating means, a food storage drawer, said drawer being disposed beneath said heater unit and extending beyond it under the remainder of the lower side of said drum, means for rotating said drum to thereby evenly expose the Frankfurters to said heater, and means for disconnecting said drum from said rotating means and for stopping it to permit discharging the Frankfurters into said drawer.

5. In a machine of the class described, the combination of a rotatable cylindrical roasting drum for loosely holding Frankfurters, said drum comprising circular end plates and a plurality of rods attached to the edges of the plates and extending between them, a heater unit underlying a part of said drum, said unit comprising a completely closed metallic casing having a curved surface conforming to the contour of said drum and containing the heat generating means, a food storage drawer, said drawer being disposed beneath said heater unit and extending beyond it under the remainder of the lower side of said drum, means for rotating said drum to thereby evenly expose Frankfurters to said heater, a door formed of said side rods and hinged to said drum, and means for disconnecting said drum from said rotating means and for stopping it with said door over said drawer to permit discharging the Frankfurters into said drawer.

6. As an article of manufacture, a food vending machine comprising a cabinet containing a steam cooking compartment and a heater therefor, a revolving cylindrical roaster and a heater therefor, a hot plate and a heater therefor, said heaters comprising a heating unit completely encased in a metallic casing, the bottom of which forms the top of an opening below the heaters, and a food storage drawer disposed in said openings and warmed by said heaters.

In witness whereof, I hereunto subscribe my name this 8th day of October, 1927.

MARTIN C. PETERSEN.